US009143193B2

(12) United States Patent
Agarwal et al.

(10) Patent No.: US 9,143,193 B2
(45) Date of Patent: Sep. 22, 2015

(54) PROCESSOR FOR A RADIO CIRCUIT

(71) Applicant: NXP B.V., Eindhoven (NL)

(72) Inventors: Manvi Agarwal, Eindhoven (NL); Klaas Brink, Waalre (NL)

(73) Assignee: NXP B.V., Eindhoven (NL)

( * ) Notice: Subject to any disclaimer, the term of this patent is extended or adjusted under 35 U.S.C. 154(b) by 127 days.

(21) Appl. No.: 14/033,133

(22) Filed: Sep. 20, 2013

(65) Prior Publication Data

US 2014/0092941 A1 Apr. 3, 2014

(30) Foreign Application Priority Data

Oct. 3, 2012 (EP) .................................... 12006869

(51) Int. Cl.
H04B 1/7136 (2011.01)
H04L 27/00 (2006.01)
H04W 72/02 (2009.01)

(52) U.S. Cl.
CPC .......... *H04B 1/7136* (2013.01); *H04L 27/0006* (2013.01); *H04W 72/02* (2013.01)

(58) Field of Classification Search
None
See application file for complete search history.

(56) References Cited

U.S. PATENT DOCUMENTS

| 6,002,924 | A | 12/1999 | Takano | |
|---|---|---|---|---|
| 8,086,197 | B2 | 12/2011 | Doris et al. | |
| 8,116,402 | B1 | 2/2012 | Lansford | |
| 8,160,163 | B1 | 4/2012 | Yucek et al. | |
| 8,532,041 | B1* | 9/2013 | Lambert et al. | 370/329 |
| 8,542,643 | B2* | 9/2013 | Gan et al. | 370/329 |
| 2008/0137634 | A1 | 6/2008 | Hassan et al. | |
| 2009/0112492 | A1 | 4/2009 | Ibrahim et al. | |
| 2009/0274081 | A1* | 11/2009 | Kwon et al. | 370/311 |
| 2010/0105332 | A1* | 4/2010 | McHenry et al. | 455/62 |
| 2010/0118921 | A1* | 5/2010 | Abdelmonem et al. | 375/148 |
| 2010/0182928 | A1* | 7/2010 | Wu et al. | 370/252 |
| 2011/0021167 | A1* | 1/2011 | Shellhammer | 455/226.1 |
| 2011/0109811 | A1 | 5/2011 | Brandsma et al. | |
| 2011/0151812 | A1* | 6/2011 | Kang et al. | 455/179.1 |
| 2011/0176436 | A1* | 7/2011 | Swaminathan et al. | 370/252 |
| 2012/0039293 | A1* | 2/2012 | Feng et al. | 370/329 |
| 2013/0237238 | A1* | 9/2013 | Kronander et al. | 455/452.1 |

FOREIGN PATENT DOCUMENTS

EP 2 282 220 A1 2/2011

OTHER PUBLICATIONS

See, M. "802.11h Helps WLANs Share Spectrum", pp. 3, retrieved from the Internet Oct. 8, 2012 at: http://www.networkworld.com/news/tech/2004/071904techupdate.html (Jul. 19, 2004).

(Continued)

*Primary Examiner* — Noel Beharry
*Assistant Examiner* — Nicole E King

(57) ABSTRACT

A processor for a radio circuit is disclosed. The processor includes a full spectrum receiver and a white space classifier. The full spectrum receiver is configured to receive an analogue radio signal comprising multiple channels within a frequency band and transform the analogue radio signal to a digital radio signal. The full spectrum receiver is also configured to transform the digital radio signal from a time domain signal to a frequency domain signal. The white space classifier is configured to identify an unused channel within the frequency band using the frequency domain signal derived from the analogue radio signal.

10 Claims, 9 Drawing Sheets

(56) References Cited

OTHER PUBLICATIONS

Cabric, D. et al. "Implementation Issues in Spectrum Sensing for Cognitive Radios", Conf. Record of the Thirty-Eighth Asilomar Conf. on Signals, Systems and Computers, pp. 772-776 (Nov. 2004).
Yucek, T., "Spectrum Characterization for Opportunistic Cognitive Radio Systems", IEEE Comm. Surveys & Tutorials, pp. 1-6 (Oct. 2006).
Steadman, K. N. et al. "Dynamic Spectrum Sharing Detectors", IEEE International Symp. on New Frontiers in Dynamic Spectrum Access Networks, 7 pgs. (Apr. 2007).
Zhao, Q. et al. "A Survey of Dynamic Spectrum Access", IEEE Intl. Conf. on Acoustics, Speech and Signal Processing, vol. 24. No. 3, pp. 1349-1352 (May 2007).
Norton, M. "Dynamic Spectrum Management", Syst 680, pp. 1-29 (Dec. 15, 2007).
Hsieh, T. et al. "A Rapid Interference Detector for Ultrawideband Radio Systems in 0.13 _m CMOS", IEEE Radio Frequency Integrated Circuits Symp., pp. 347-350 (2008).
Kim, H. et al. Efficient Discovery of Spectrum Opportunities with MAC-Layer Sensing in Cognitive Radio Networks, IEEE Trans. on Mobile Computing, vol. 7, No. 5, pp. 533-545 (May 2008).
Wexler, J. "Clearing the air about DFS, What Does Dynamic Frequency Selection Mean—or Not Mean—to You?", 4 pgs., retrieved from the Internet Oct. 8, 2012 at: http://www.networkworld.com/newsletters/wireless/2008/072108wireless1.html(Jul. 21, 2008).
Yucek, T. et al "A Survey of Spectrum Sensing Algorithms for Cognitive Radio Applications", IEEE Comm. Survey & Tutorials, vol. 11, No. 1, pp. 116-130 (2009).
Vos, E. "Another One Bites the Dust: Worldmax Shuts WiMAX Network in Amsterdam", 3 pgs., retrieved from the Internet Oct. 8, 2012 at: http://www.muniwireless.com/2010/06/22/worldmax-shuts-wimax-inamsterdam/ (Jun. 22, 2010).
Albanesius. C. "FCC Opens TV 'White Spaces' for Super Wi-Fi", 8 pgs., retrieved from the Internet Oct. 8, 2012 at: http://www.pcmag.com/article2/0,2817,2369580,00.asp (Sep. 23, 2010).
Jabbari, B. et al. "Dynamic Spectrum Access and Management", IEEE Wireless Comm., vol. 17, No. 4, pp. 6-15 (Aug. 2010).
Doris, K. et al. "A 480mW 2.6GS/s 10b 65nm CMOS Time-Interleaved ADC with 48.5dB SNDR up to Nyquist", IEEE Intl. Solid-State Circuits Conf. Dig. of Tech. Papers, pp. 180-182 (Feb. 2011).
"Spectrum Management", 7 pgs., retrieved from the Internet Oct. 8, 2012 at: http://en.wikipedia.org/wiki/Unlicensed_spectrum.
"TV-Band Device", 2 pgs., retrieved from the Internet Oct. 8, 2012 at: http://en.wikipedia.org/wiki/TV-band_device.
"Master Project Spectrum Sensing Demonstrator", 1 pg., retrieved from the Internet Oct. 8, 2012 at: http://w3.ele.tue.nl/en/centre_for_wireless_technology/research/vacancies/masters_project_spectrum_sensing_demonstrator/.
IEEE 802.11h-2003, 2 pgs, retrieved from the Internet Oct. 8, 2012 at: http://en.wikipedia.org/wiki/IEEE_802.11h.
Rikkonen, E. et al Cognitive Radio: General Concepts and 802.22, 23 pgs., retrieved from the Internet Oct. 8, 2012 at: http://www.cs.tut.fi/kurssit/TLT-6556/Slides/5-CognitiveRadio.pdf.
Schwartz, S. M. "Frequency Hopping Spread Spectrum (FHSS) versus Direct Sequence Spread Spectrum (DSSS) in Broadband Wireless Access (BWA) and Wireless LAN", 16 pgs., retrieved from the Internet Oct. 8, 2012 at: http://www.sorin-schwartz.com.
Gandetto, M. "Use of Time-Frequency Analysis and Neural Networks for Mode Identification in a Wireless Software-Defined Radio Approach", EURASIP J. on Applied Signal Processing, pp. 1778-1790 (Dec. 2004).
Extended European Search Report for EP Patent Appln. No. 12006869.7 (Mar. 6, 2013).

\* cited by examiner

Figure 3 Binary ASK

Figure 4 Binary FSK

Figure 5 Binary PSK

PROCESSOR FOR A RADIO CIRCUIT

CROSS-REFERENCE TO RELATED APPLICATIONS

This application claims the priority under 35U.S.C. § 119of European patent application no. 12006869.7, filed on Oct. 3, 2012, the contents of which are incorporated by reference herein.

The present disclosure relates to a processor for a radio circuit. Particularly, although not exclusively, the present disclosure relates to a processor for a multi-channel radio frequency receiver.

The continuous increase in the utilisation of wireless devices necessitates the more efficient use of the radio frequency spectrum. A dynamic spectrum allocation scheme can be realized when every wireless device in mutual communication continuously monitors the spectrum for concurrent usage (spectrum sensing).

According to an aspect of the invention, there is provided a processor for a radio circuit, the processor comprising a full spectrum receiver and a white space classifier, wherein the full spectrum receiver is configured to:

receive a radio signal comprising multiple channels within a frequency band; and transform the analogue radio signal to a digital radio signal;

transform the digital radio signal from a time domain signal to a frequency domain signal, and wherein the white space classifier is configured to identify an unused channel within the frequency band using the frequency domain signal derived from the radio signal.

The processor may be referred to as a white space detector. A white space detector may also be referred to as a white space classifier. The processor may comprise a full spectrum receiver (FSR). A FSR is a device in which wide-band digitization is used to capture a complete composite input signal. The full spectrum receiver comprises an analogue to digital converter. The full spectrum receiver comprises a Fourier transform block. The transformation of the radio signal from the time domain to the frequency domain is performed by a Fourier transform block of a full spectrum receiver (FSR). The FSR may be used to perform both full-spectrum sensing and data reception in a single integrated device. More generally, the processor may be an integrated device that performs spectrum sensing and data reception simultaneously. The information obtained from the full-spectrum sensing may be used for dynamic frequency selection (DFS) in dynamic channel systems, such as WLAN devices, for example.

The FSR samples the full-spectrum with the purpose of spectrum sensing as well as data demodulation and decoding (integration). Spectrum sensing can be performed to identify non-occupied parts of the spectrum at any instant in time. Predictions regarding future occupation of the spectrum (for example, observed with spread spectrum encoding) could be realized based on historic data. The processor may predict future spectrum occupation using historic data.

Application of a FSR in a white space detector can offer a considerably simplified solution compared to dual-radio approaches, in which dedicated hardware is provided for spectrum sensing and separate hardware is provided for signal reception, because detection and data reception is provided by a single integrated functional unit. to Employing a FSR makes (sequential) spectrum scanning superfluous (single radio architecture) and provides a considerable simplification compared to non-integrated dual-radio architectures with dedicated spectrum sensing provisions. A FSR solution can unify the advantages of both dual and single radio architectures such as improved power efficiency, higher spectrum usage efficiency and lower manufacturing cost.

The ability of the processor to sample the full-spectrum at a single time instant facilitates detection of non-fixed frequency transmissions. Non-fixed frequency transmissions may also be referred to herein as dynamically allocated channels. An example of dynamically allocated channels is spread-spectrum systems, for example, as used in certain WLAN standards or in Bluetooth.

The processor may be further configured to select one of said any unused channels as a candidate channel for transmission. The processor may select all of the identified unused channels as candidate channels for transmission so as to maximise use of the available bandwidth. The processor may provide an instruction to a transmitter to transmit on the candidate channel or channels. The instruction may consist of an indication of the candidate channel or channels for transmission. The transmitter may interpret the indication of the candidate channel or channels for transmission as an instruction to use that channel or channels for a subsequent transmission. The processor may be further configured to determine if a portion of identified white space has sufficient bandwidth to be used as a candidate channel.

The processor may be configured to identify an unused channel that has been used within a predetermined preceding period of time or a predetermined number of channel hops and either select or deselect that unused channel as a candidate channel. The predetermined number of channel hops may be the last 1, 5, 10, 20, 50 or 100 channel hops. The processor may anticipate future channel interference by providing candidate channels that follow the hopping sequence of another transmitter or transmitters incorporating a (fixed and identifiable) delay. That is, the processor may select candidate channels that have been used recently by the other transmitter and so are unlikely to be used again by the other transmitter or transmitters.

Detection of frequency hop spread spectrum (FHSS) or direct-sequence spread spectrum (DSSS) may be possible using embodiments of the present invention. Such detection requires spectrum usage in the so-called 'code dimension', as is known in the art.

In a radio signal comprising dynamically allocated channels, the region of the frequency band occupied by used channels can vary with time. In contrast, in a radio signal comprising static channels, the region of the frequency band occupied by used channels does not vary with time over substantial periods, such as hours or days. Herein, a dynamically allocated channel may be considered to be a channel with a typical duration of less than 1 minute at a given frequency band. Conversely, a static channel may be considered to be a channel with a typical duration of more than 1 minute at a given frequency band. Digital television broadcast may be considered to be an example of a radio signal comprising static channels, or statically allocated channels. Bluetooth may be considered an example of a radio signal comprising dynamically allocated channels.

The verb to "identify", may be considered to be interchangeable with the verb to "classify", when used herein.

A channel, either used or unused, may be of a predetermined, fixed frequency bandwidth. Alternatively, the bandwidth of the channels may be varied to correspond to the bandwidth of a continuous portion of the frequency band in which the signal level is low.

The processor may further comprise a full spectrum receiver configured to transform the radio signal from a time domain signal to the frequency domain signal. The full spectrum receiver may be further configured to provide the frequency domain signal as a frequency domain output signal. The frequency domain output signal may comprise an output signal representing any information present within at least one channel of the transformed radio signal.

The processor may be configured to provide the frequency domain output signal whilst the processor identifies any unused channels. The radio signal may comprise dynamically allocated channels. The processor may be further configured to continuously or periodically identify any unused channels within the frequency band using the frequency domain signal.

The processor may be configured to simultaneously identify whether a plurality of channels are unused. The processor may be configured to simultaneously identify whether all of the respective channels of the frequency band are unused The processor may be configured to utilise cyclostationary feature detection in order to identify unused channels. Alternatively, or in addition, the processor may be configured to determine a power spectral density of the radio signal over at least part of the frequency band. The processor may be configured to identify portions of the frequency bands with a power spectral density below a threshold value as white space. White space may be considered to represent an unused channel or channels. The threshold value may be a predetermined value. The threshold value may be defined with reference to the mean power of a portion of the frequency band.

The processor may be implemented by software. The processor may be configured to store information relating to identified unused channels in a memory. The memory may be a random access memory. The memory may be a volatile memory.

The processor may be configured to identify channels in the frequency band that comprise interference signals. A channel may be considered to comprise an interference signal if the signal strength within the frequency band of the channel, or within a portion of the channel, is above a threshold level.

The frequency band may be in the range 0 to 1 GHz. The frequency band may be greater than 100 MHz. The frequency band may be greater than 500 MHz. The frequency band may be less than 1 GHz. The frequency band may be less than 10 GHz. The frequency band may be less than 500 MHz.

The processor may be configured to apply a Fourier transform to transform the radio signal. The full spectrum receiver may perform the Fourier transform operation. The Fourier transform may be implemented using a fast Fourier transform algorithm operation.

The processor may be configured to identify a continuous region of white space in the frequency domain. The processor may be configured to calculate the width of the region of white space. The processor may be configured to determine if the width of the region of white space provides sufficient bandwidth to provide a channel on which a transmitter may transmit.

A wireless device may be provided. The wireless device may comprise any processor disclosed herein.

A portable communications device may be provided. Any circuit, integrated circuit or analogue to digital converter disclosed herein may be suitable for the portable communications device. There may be provided a portable communications device comprising any analogue to digital converter, circuit, processor or integrated circuit disclosed herein. Such a portable communications device may be a mobile telephone, smartphone, tablet, personal digital assistant, or laptop computer, for example.

According to another aspect of the invention, there is provided method of processing a radio signal comprising:

receiving a radio signal comprising multiple channels within a frequency band;

transforming the radio signal from a time domain signal to a frequency domain signal; and identifying an unused channel within the frequency band using the frequency domain signal derived from the radio signal.

The invention will now be described by way of example only, and with reference to the appended drawings, in which.

Figure 1:
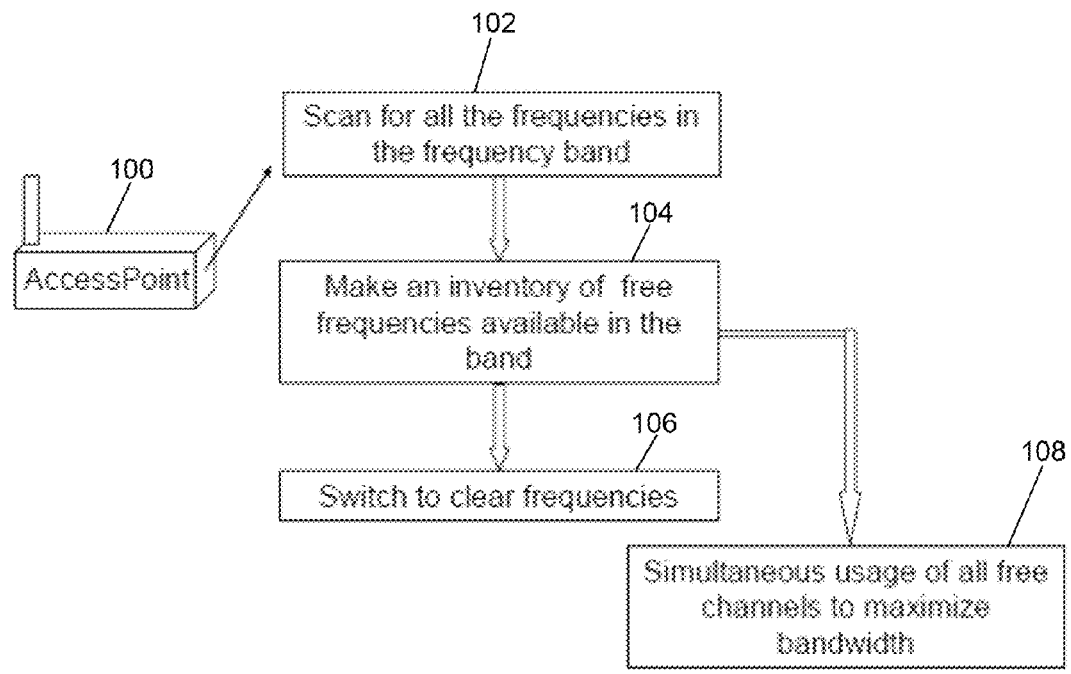
FIG. 1 shows a process performed by a processor in an access point according to an embodiment of the invention.

The local detection of occupied frequencies is difficult and in addition, non-local means of detection are employed to identify free parts of the spectrum. For example, a device may consult a spectrum usage database based on GPS location.

Recently, the US FCC freed up part of the spectrum (formerly reserved for TV transmission) for use in Wide Region Area Networking (WRAN). IEEE standard 802.22 relates to these systems. So-called 'white space devices' (WSD) are allowed to use empty parts of the TV spectrum provided that they do not interfere with TV transmissions.

Bluetooth employs a variant of frequency-hopping spread spectrum (FHSS) called adaptive frequency-hopping (AFH). In AFH, channels are excluded when a device senses that they are occupied or subject to too much interference.

Spectrum sensing involves monitoring the spectrum to determine which parts of the spectrum are in use. Preferably, spectrum sensing takes place continuously to allow for immediate interference detection and adaption of any signal transmission so as to minimize interference.

Channel use detection can be performed by scanning the spectrum: a dedicated tuner device is tuned to a particular band within a relevant frequency spectrum and used to detect the transmission of signals within this band. The dedicated tuner is then tuned to the next frequency band and the detection is performed again. This procedure is repeated until the full spectrum of interest is scanned, after which the procedure may be repeated. A separate tuner may be used to receive transmissions in addition to the dedicated tuner used for detecting channel use.

TV receivers can employ a full spectrum receiver (FSR) to decode transmissions. A service scan is performed infrequently in such systems. This approach is acceptable as the radio spectrum utilization of TV channels is static (and usually regulated by law).

Spectrum sensing for wireless devices (secondary users opportunistic user/usage) can be regarded as fundamentally different to television reception. Identifying empty spaces in the frequency spectrum for wireless devices can be useful to (i) reveal potential transmission channels and (ii) detect interference. As opposed to the regulated and time-constant characteristic of television transmissions, spectrum use of wireless devices is much more dynamic and opportunistic. Spectrum monitoring can take place continuously in wireless systems and in practice is only limited by technical reasons (such as selectivity constraints of a wideband receiver) or physical reasons (such as self interference, spatial distribution).

Alternatively, dynamic spectrum access solutions can employ a separate tuner for spectrum scanning ('sequential scan') in addition to a tuner for signal reception. In such a solution, each potential channel (portion of the frequency band) may be monitored individually in sequence for transmission activity.

In practice, spectrum sensing is usually implemented using a scanning-based approach. One reason for this is that suitable wideband receivers may only be able to analyze a small part of the spectrum.

Spectrum sensing by local nodes can be intrinsically imperfect due to so-called 'hidden primary user' and various issues need to be dealt with in such sensing systems, such as Rayleigh fading or the need to compensate for noise in order to determine a proper signal threshold, for example. A cooperation scheme between nodes may be required to assure reliable signal detection in a network of wireless nodes.

A processor according to an embodiment of the invention can be used to identify white spaces in a spectrum by identifying an unused channel in a frequency domain signal derived from a received radio signal.

In some embodiments, the processor comprises a full spectrum receiver (FSR). The FSR need not, in some embodiments, be limited to a certain frequency interval and is applicable to a wide variety of circumstances. In practice the FSR can be employed to sample the part of the radio spectrum that is of interest. That is, perhaps, a region of the spectrum that has its use limited by regulations or standards, or limits imposed due to the particular transmission or reception equipment that is used.

FIG. 1 illustrates a method employed by a radio circuit 100 (access point) in accordance with an embodiment of the invention. FIG. 1 shows method steps 102, 104, 106 and 108 along with the radio circuit 100 that can perform one or more of the method steps.

A processor within the radio circuit 100 scans all of the frequencies in a frequency band of a radio signal at step 102 and makes an inventory of free frequencies available in the frequency band at step 104. The radio circuit 100 may use a full spectrum receiver (FSR) function of the processor to 'scan' substantially the entire frequency band of the radio signal simultaneously. The processor of the radio circuit 100 is configured to then switch operation to clear frequencies at step 106 and optionally make simultaneous use of all free channels to maximize bandwidth at step 108.

Figure 2:
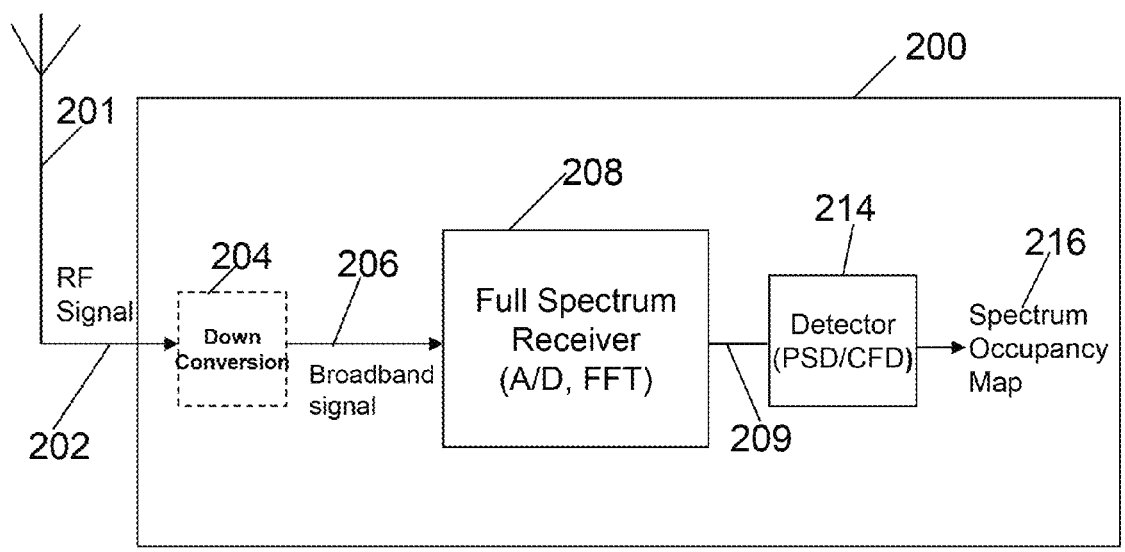
FIG. 2 shows a block diagram of a processor for a wireless device.

FIG. 2 illustrates the top-level architecture of a processor 200 for dynamic spectrum access. The processor 200 may also be referred to as a white space detector. The processor optionally comprises a down converter 204, a multi-channel receiver 208, and a detector 214. The multichannel receiver 208 may be provided by a full spectrum receiver (FSR).

The FSR is a device in which wide-band digitization is used to capture a complete composite input signal. In the present application, the FSR comprises an analogue to digital converter and a Fourier transform block.

The processor 200 receives an RF signal 202 from an antenna 201, in this example.

The RF signal 202 undergoes down conversion by down converter 204 to provide a broadband signal 206, although it will be appreciated that this step is not essential in all embodiments. The broadband signal 206 is provided to a multichannel receiver 208. The multichannel receiver 208 may be a full spectrum receiver. The multichannel receiver 208 performs analogue to digital conversion of the signal and transforms the broadband signal 206 from a time domain signal to a frequency domain signal 209. The transformation performed by the multi-channel receiver 208 may be implemented using a fast Fourier transform, for example. The frequency domain signal 209 is also provided to a detector 214, which may perform power spectral density or cyclo-stationary feature detection, for example, in order to determine a spectrum occupancy map 216. The spectrum occupancy map 216 comprises details of empty channels or "white space" within the bandwidth of the radio signal.

The processor 200 may be used to perform both full-spectrum sensing and data reception in a single integrated device. The information obtained from the full-spectrum sensing, for example the spectrum occupancy map 216, may be used for dynamic frequency selection in dynamic channel systems, such as WLAN devices, for example.

An implementation of a FSR that can be used with embodiments of the present invention is described in Kostas Doris, Erwin Janssen, Claudio Nani, Athon Zanikopoulos, Gerard Van der Weide "*A 480 mW 2.6GS/s 10b 65 nm CMOS Time-Interleaved ADC with 48.5 dB SNDR up to Nyquist*" IEEE ISSCC (2011) session 10, page 180-181. 10 GHz bandwidth may be achieved by some FSR implementations.

In one example of a FSR, the signal is first amplified by a LNA/VGA. The amplified signal is then digitized by an analogue to digital converter. The output of the analogue to digital converter can be provided to a multi-band selector, which splits the output signal into a number of bands. These bands can be passed to a number of channel selector blocks that perform fine selection. Multiple digital output streams can be provided simultaneously by a FSR.

Analysis of the spectral data by the detector 214 allows certain bands to be identified as white space. A simplified algorithm, similar to power spectral density (PSD) analysis, could be used to calculate the mean FFT bin value and mark a frequency band as white space in the case that its FFT bin value is lower than the mean or any other threshold. Further details of this functionality are provided below with reference to FIGS. 9 to 13.

Figure 3:
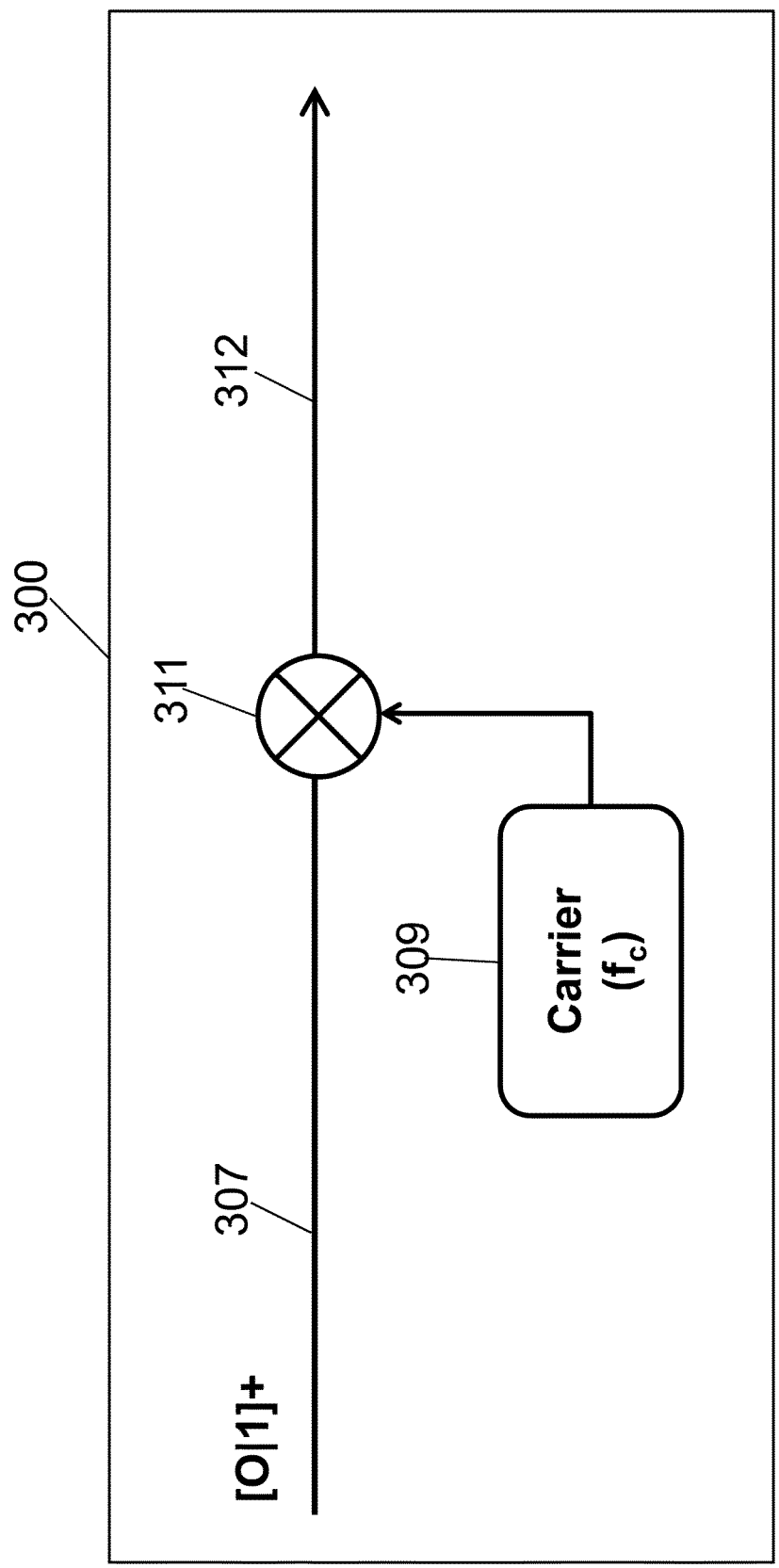
FIG. 3 shows a block diagram for providing a simulated amplitude shift keying (ASK) signal.
Figure 4:
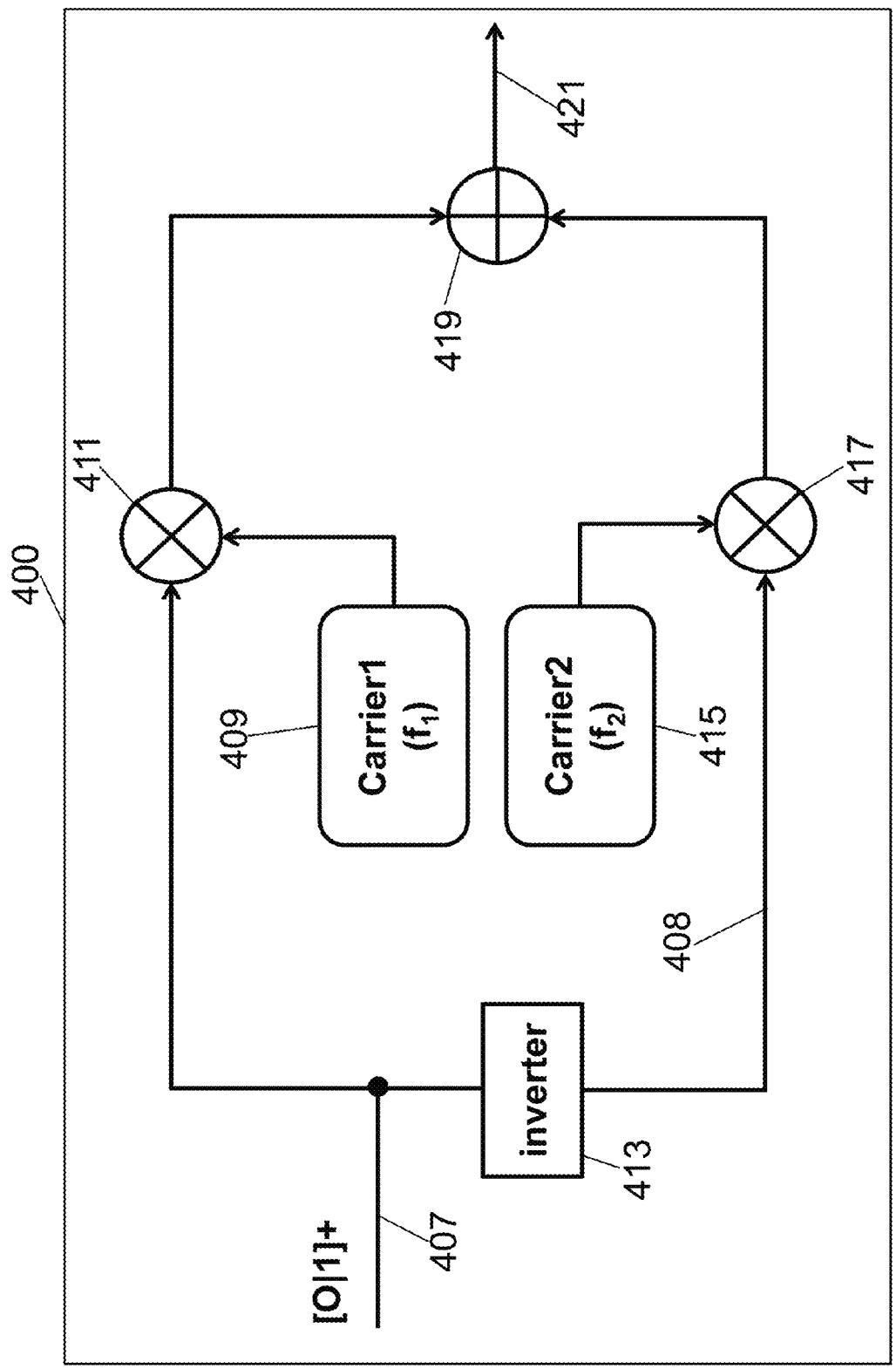
FIG. 4 shows a block diagram for providing a simulated frequency shift keying (FSK) signal.
Figure 5:
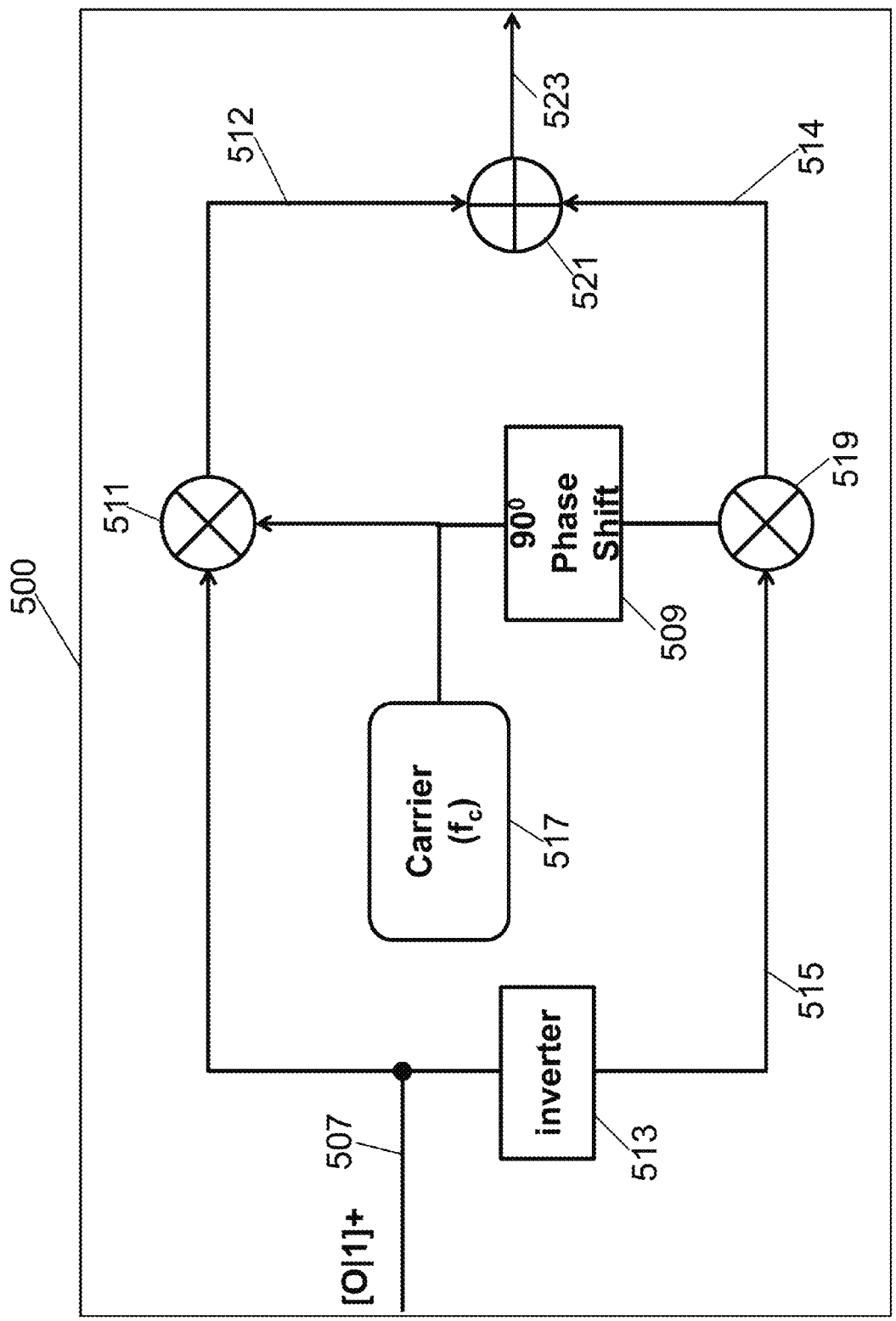
FIG. 5 shows a block diagram for providing a simulated phase shift keying (PSK) signal.

FIGS. 3 to 5 illustrate three different block diagrams that can be used to generate simulated spectra signal that may be provided to a white space detector in accordance with the present invention. The resultant spectra of FIGS. 3 to 5 are provided to a simulator of an embodiment of the present invention, illustrated in the block diagram of FIG. 6.

FIG. 3 provides an example block diagram for simulating an amplitude shift keying (ASK) signal that may be provided to a white space detector in accordance with the present invention. A binary input bit stream 307 is mixed with a generator carrier frequency 309 by a mixer 311 to produce an ASK modulated signal 312. The ASK modulated signal 312 is an output ASK signal with a carrier frequency of the generator carrier frequency 309.

FIG. 4 provides an example block diagram for simulating a frequency shift keying (FSK) signal that may be provided to a white space detector in accordance with the present invention. A random binary bit stream 407 is mixed with a first FSK carrier frequency (f1) 409 by a first FSK mixer block 411. The random binary stream 407 is also inverted by an inverter block 413 to produce an inverted binary stream 408. The inverted binary stream 408 is mixed with a second FSK carrier frequency (f2) 415 by a second FSK mixer block 417. The second FSK carrier frequency 415 is different from first FSK carrier frequency 409. Signals from the first and second FSK mixer blocks 411, 417 are mixed together at a FSK summation block 419 to get FSK modulated signal 421.

FIG. 5 provides an example block diagram for simulating binary phase shift keying (PSK) signal that may be provided to a white space detector in accordance with the present invention. A random binary input bit stream 507 is mixed with a carrier frequency 517 by a first PSK mixer block 511 to provide a first modulated signal 512. The random input bit stream 507 is also inverted by an inverter block 513 that outputs an inverted random bit stream 515. The carrier frequency is also provided to a 90 degree phase shift block 509 that provides a phase shifted frequency. The phase shifted frequency is mixed with the inverted bit stream 515 by a second PSK mixer block 519 to provide a second modulated signal 514. The first and second modulated signals 512, 514 are added together by a PSK summing block 521 that provides a binary phase shift keying modulated signal 523.

Figure 6:
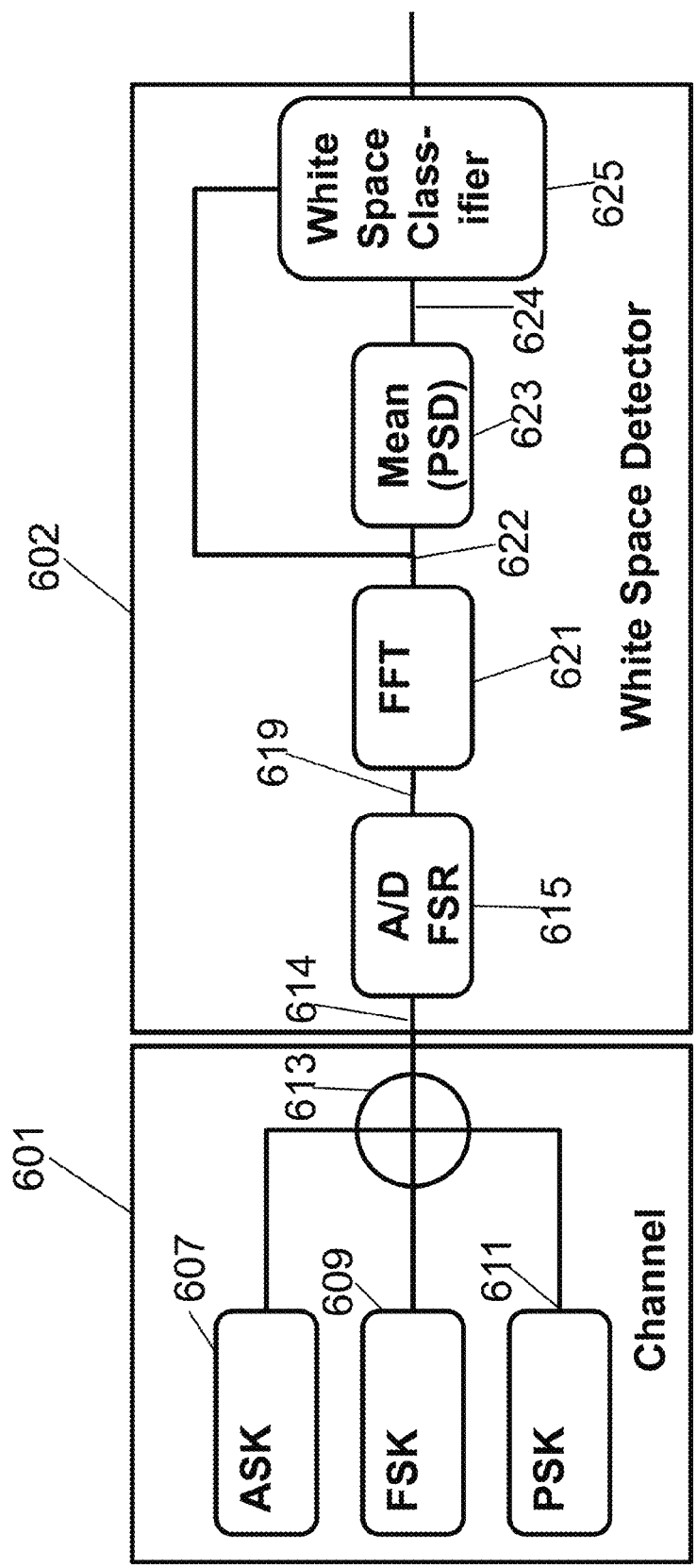
FIG. 6 illustrates a simulation of a white space detector using a full spectrum receiver (FSR) according to an embodiment of the invention.

FIG. 6 illustrates the block diagram of a white space detector 602. Also shown in FIG. 6 is a channel block 601, which is a representation of a frequency band that has a number of channels in it. The channel block 601 is a combination of the various simulation block diagrams illustrated in FIGS. 3 to 5. The white space detector 602 is an example of a block diagram implementation of an embodiment of the invention.

The outputs of the ASK, FSK and PSK blocks 607, 609, 611 are added together by an adder 613. The output of the adder 613 can be considered to be the simulated signal that is to be processed by the white space detector 602. The spectra shown in FIGS. 7 and 8 will now be discussed before returning to FIG. 6 to describe operation of the white space detector 602.

Figure 7:
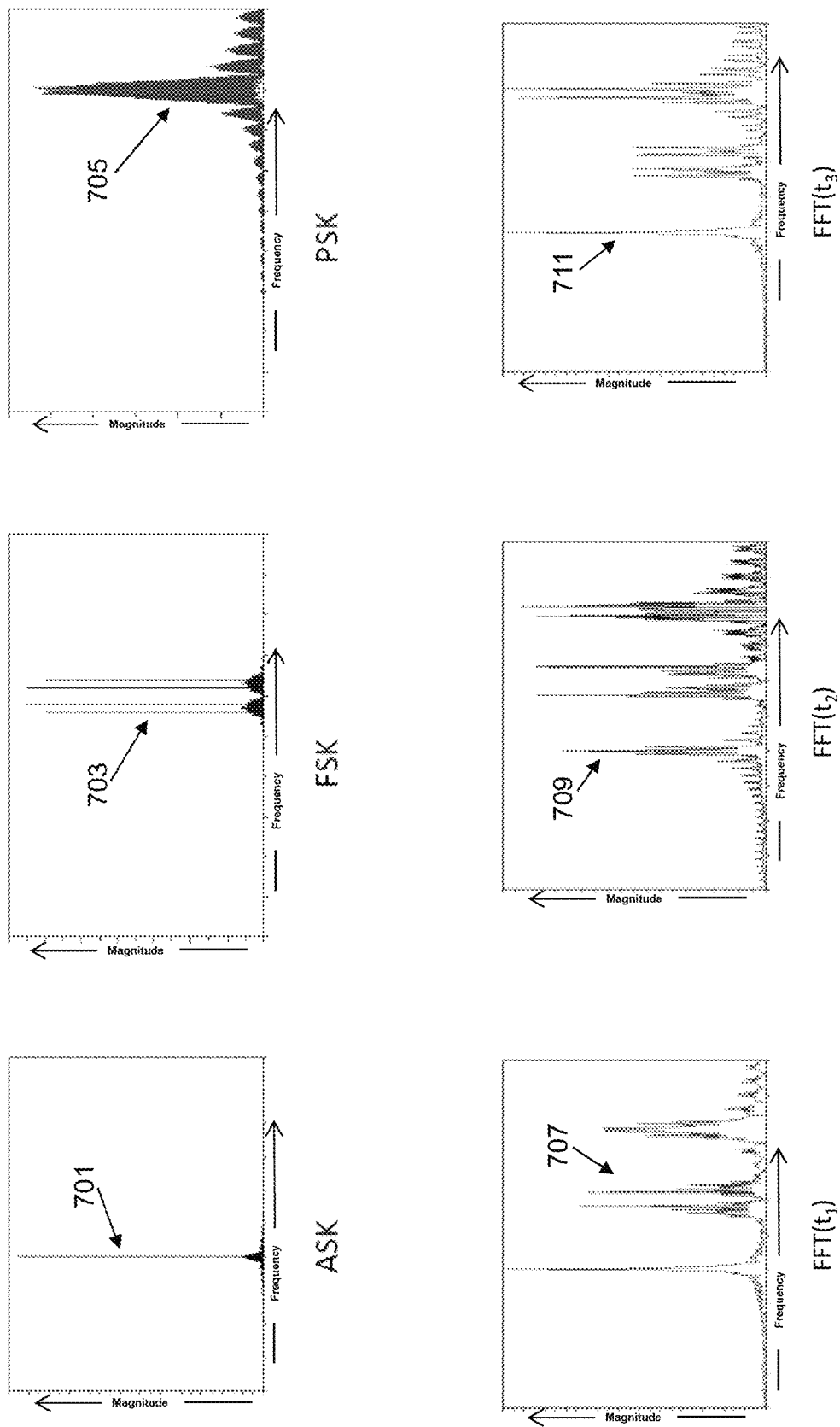
FIG. 7 shows a series of spectra generated by the block diagrams of FIGS. 4 to 6.

FIG. 7 shows individual Fourier transformed spectra obtained from the ASK, FSK and PSK blocks 607, 609, 611 of FIG. 6. An ASK spectrum in the frequency domain is shown with reference 701. A FSK spectrum in the frequency domain is shown with reference 703. A PSK spectrum in the frequency domain is shown with reference 705. FIG. 7 also shows FFTs of a number of consecutive series of samples comprising a first series of samples 707, a second series of samples 709 and a third series of samples 711.

The ASK spectrum 701 comprises a Dirac-type peak at the centre of features that is similar to a single slit interference pattern. The off-centre peaks have a lower relative amplitude than the Dirac peak. The FSK spectrum 703 comprises several Dirac-type peaks, two low amplitude Gaussian peaks are shown adjacent to one another, each with a Dirac-type peak emanating from their centre. The PSK spectrum 705 has an appearance similar to a single slit interference pattern.

Figure 8:
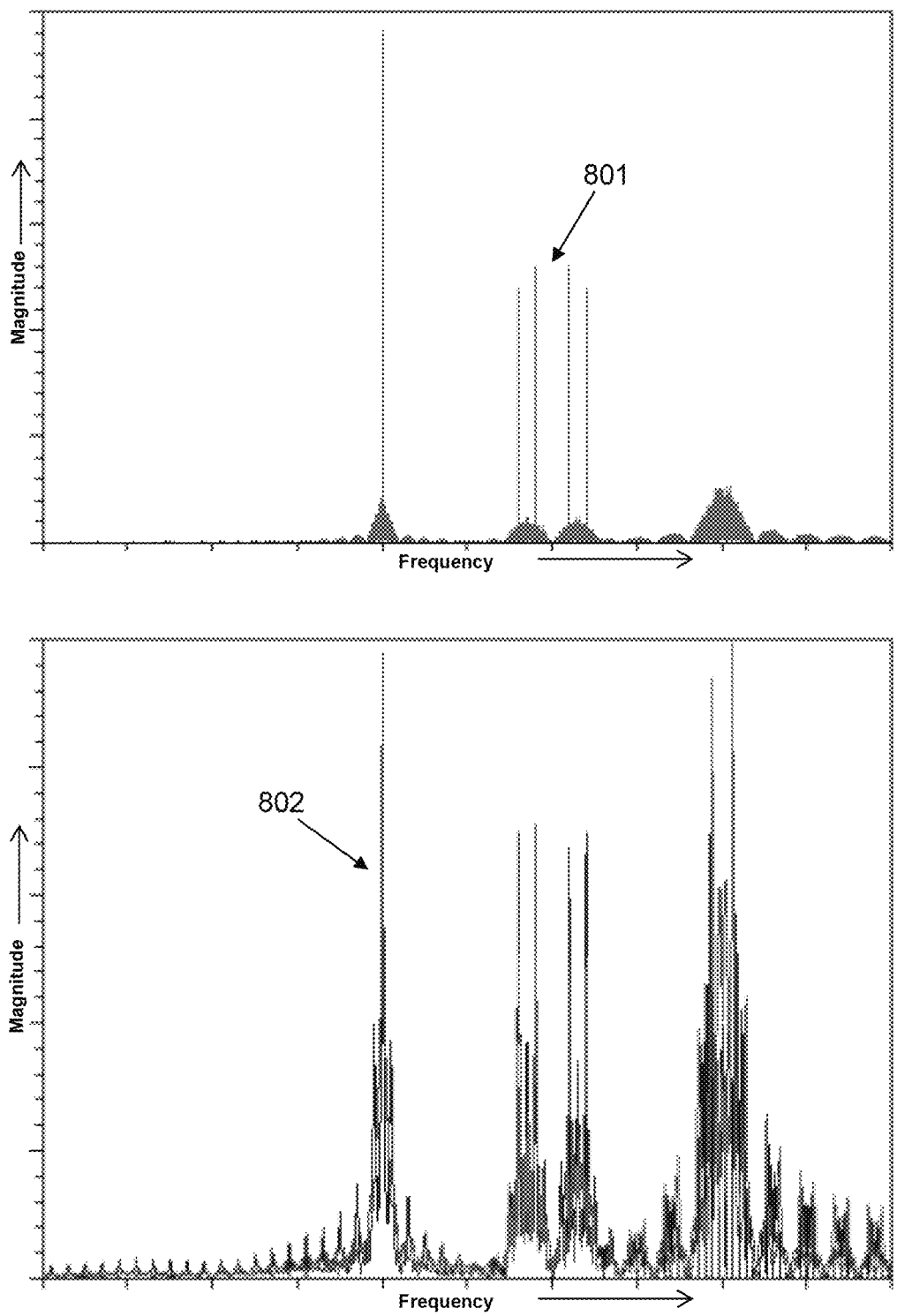
FIG. 8 shows the combination of the spectra illustrated in FIG. 7.

The combination of the individual ASK, FSK and PSK spectra 701, 703, 705 of FIG. 7 is shown in the simulated signal spectrum 801 of FIG. 8. The combination of the consecutive series of FFT samples 707, 709, 711 of FIG. 7 is shown in the FFT spectrum 802 of FIG. 8.

FIGS. 7 and 8 shows that the consecutive series of FFT samples 707, 709, 711 for the different types of keying at intervals t1, t2 and t3 are similar to one another because of the presence of three static transmitters. In the case where frequency hopping (e.g. Frequency Hopping Spread Spectrum (FHSS)) is employed by a transmitter, analysis of one series of samples will identify which parts of the spectrum are empty at an instant in time, and which parts are occupied. Comparison between a series of samples taken at different time intervals may be employed to determine the evolution of spectrum usage and can be used to reveal the presence of a transmitter that employs frequency hopping.

A characteristic of a transmitter employing FHSS is that one single part of the spectrum is occupied at a single time instant only. Bluetooth employs Adaptive Frequency Hopping (AFH). In AFH, carrier frequencies (channels) that are found to cause too much interference can be skipped, or avoided, and not used for transmission.

The implementation of a FSR in a white space detector according to an embodiment of the invention can provide an advantage over narrowband receivers in both FHSS and AFH transmission schemes. Knowledge gained over time regarding presence of 'frequency hopping' transmitters could, for example, be used to make more intelligent decisions as to which channel or channels to transmit on. One example is that the system may avoid all channels that have been found to have been occupied recently. In this context, recently may mean within a predetermined preceding period of time or number of channel hops. A channel that has been used within the last 10, 20, 50 or 100 channel hops may be considered to have been used recently, in some embodiments. Another example is that the system may anticipate future channel interference by determining the hopping sequence of another transmitter incorporating a (fixed and identifiable) delay and identifying a candidate channel that is next or soon (within a predetermined period of time or number of channels hops) in the sequence. Alternatively, the system may select channels that have been used recently by the other transmitter and so are unlikely to be used again by the other transmitter.

Returning to FIG. 6, the white space detector 602 comprises a full spectrum receiver (FSR) 615, a Fourier transform block 621, an analysis function block 623 and a white space classifier 625. The white space detector 602 receives the simulated signal from the channel simulator 601 as an input signal 614. The input signal 614 is in the time domain. The FSR performs analogue to digital conversion of the input signal and provides the digitised signal to the FFT block 621. The FFT block 621 may also be considered to be a component of the FSR. The FFT block 621 transforms the signal 619 into a frequency domain signal 622. The Fourier transform block 621 can repeatedly sample the input signal 619 after a period of time has elapsed. Alternatively, the Fourier transform block 621 can continuously sample the input signal 619. The frequency domain signal 622 is provided from the Fourier transform block 621 to the analysis function block 623. An output of the analysis function block 623 provides a classifiable signal 624, which is discussed below in more detail.

The white space detector 602 is capable of sampling the full spectrum of interest, in some embodiments simultaneously. It will be appreciated that analogue to digital conversion is implicit in the simulation diagram shown.

In this example, the analysis function block 623 performs a power spectral density operation on the frequency domain signal 622. The classifiable signal 624 may be a power spectrum, in such an example. An alternative implementation of the analysis function block 623 is to provide cyclo-stationary feature detection processing.

The classifiable signal 624 is provided to a white space classifier 625. The white space classifier 625 is configured to determine regions of the spectrum where no substantial signal is present. This is discussed in more detail below. Such regions of the spectrum are also referred to as white space. The white space classifier 625 provides an output signal indicative of the regions of white space in the input signal 619.

The white space classifier can also determine whether there are suitable unused channels within the identified white space. A portion of white space may be 'suitable' if it has sufficient bandwidth to provide a channel. The methods described herein to detect white space may not require any knowledge about the modulation scheme of the channel that is used.

The ability to simultaneously sample the full-spectrum at a single time instant facilitates improved and convenient detection of non-fixed frequency transmissions. Non-fixed frequency transmissions may also be referred to herein as dynamically allocated channels. An example of dynamically allocated channels is spread-spectrum systems, for example, as used in certain WLAN standards or in Bluetooth.

The functions of the white space detector 602 may be provided in a transceiver such that spectrum analysis can be performed to identify unused spaces in the frequency spectrum in order to enable transmission in an empty channel. The information obtained from the full-spectrum sensing and white space classification may be used for dynamic frequency selection in dynamic channel systems, such as WLAN devices, for example. That is, information regarding the unused channels identified by the white space classifier 625 can be provided to a transmitter to enable the transmitter to use those channels.

Application of a FSR in a white space detector according to an embodiment of the invention can offer a considerably simplified solution compared to dual-radio approaches, in which dedicated hardware is provided for spectrum sensing and separate hardware is provided for signal reception, because detection and data reception is provided by a single, integrated, functional unit. Employing a FSR can make sequential spectrum scanning (which may be provided in a single-radio architecture) superfluous (single radio architecture) and can provide a considerable simplification compared to non-integrated dual-radio architectures with dedicated spectrum sensing provisions. An FSR solution can unify the advantages of both dual and single radio architectures such as improved power efficiency, higher spectrum usage efficiency and lower manufacture cost.

Figure 9:
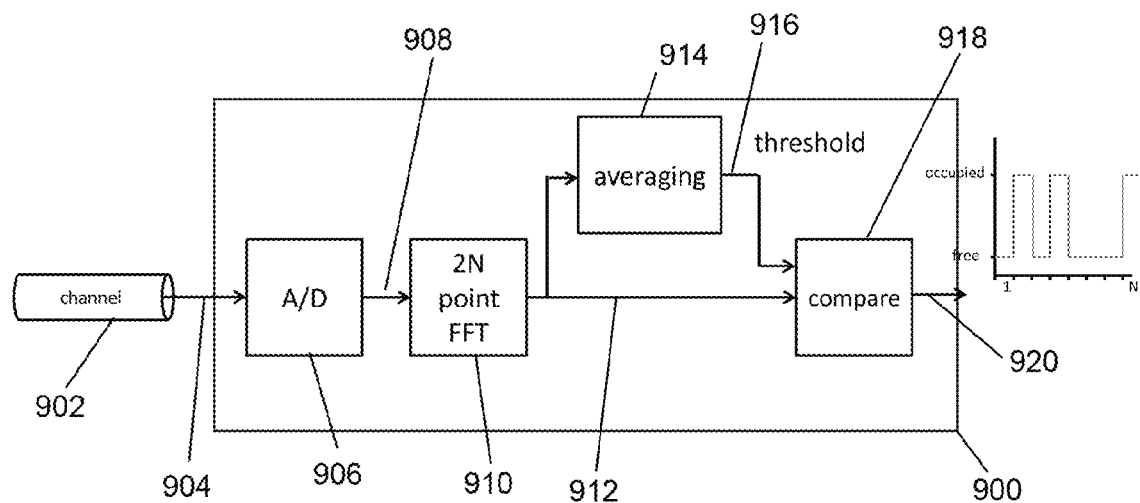
FIG. 9 shows a block diagram of a white space detector implemented using an energy detector according to an embodiment of the invention.

FIG. 9 illustrates a block diagram of a white space detector 900 according to an embodiment of the invention, which may provide the functions of the white space detector 602 of FIG. 6. In this white space detector 900, an averaging and filtering unit 914 calculates a spectral power estimate.

In FIG. 9, a channel 902 provides an input radio signal 904 to an analogue to digital converter 906. The analogue to digital converter 906 provides a digital time domain signal 908 to a 2N point fast Fourier transform block 910. The analogue to digital converter 906 and the fast Fourier transform block 910 can be considered to provide a full spectrum receiver. The FFT block 910 provides a frequency domain signal 912 to an averaging block 914. The averaging block 914 provides an averaged signal 916 representative of the average energy level across the frequency band of the input radio signal 904 to a comparator 918. The comparator 918 compares and filters the averaged signal 916 with the frequency domain signal 912 derived from the input radio signal 904. The comparator 918 provides an output signal 920 that is indicative of whether each frequency bin within the input radio signal 904 has an energy above the threshold level, or not. The output signal 920 provides an indication of whether a portion of the frequency band is occupied or free.

The main operations performed by in the white space detector 900 of FIG. 9 are provided in the simulation code fragment below.

```
......
N            = 1024;                    // choose 1024-point
                                            DFT
sample_rate  = 100000;                  // sampling f=100kHz
f            = sample_rate*(0:(N/2))/N; // #frequency bins
......
values(t) == <value at time t>
......
y=dft(values,-1);                       // Discrete Fourier Transformation
magnitude = abs(y(1:len));              // abs( ) returns the magnitude of
                                        // a complex value
//
// White space classification based on average bin value
//
avg = sum(magnitude(1:len))/len;
for ix=1:len
    if magnitude(ix)<=avg then
        whitespace(ix) = WHTSPACE;      // frequency bin classified as
                                        // white space
    else
        whitespace(ix) = OCCUPIED;      // frequency bin classified as
                                        // occupied
    end
end
```

Figure 10:
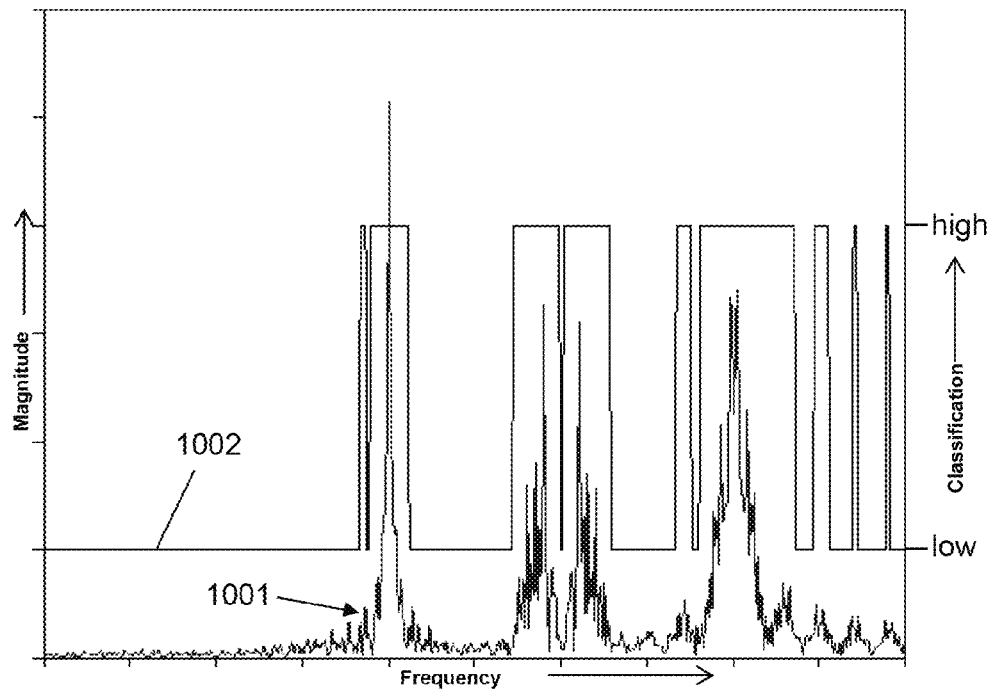
FIG. 10 illustrates an example frequency domain signal and the corresponding output of the white space detector of FIG. 9.

FIG. 10 shows the FFT magnitude, against frequency, in Hertz, on the horizontal axis. FIG. 10 plots an example frequency domain signal 1001 and the corresponding output 1002 of the white space detector 900 of FIG. 9. When the frequency domain signal 1001 is below a threshold, the corresponding output 1002 is low, indicating that whitespace is present at that frequency. Conversely, the frequency domain signal 1001 is above the threshold, the corresponding output 1002 is high, indicating that whitespace is not present at that frequency.

Figure 11:
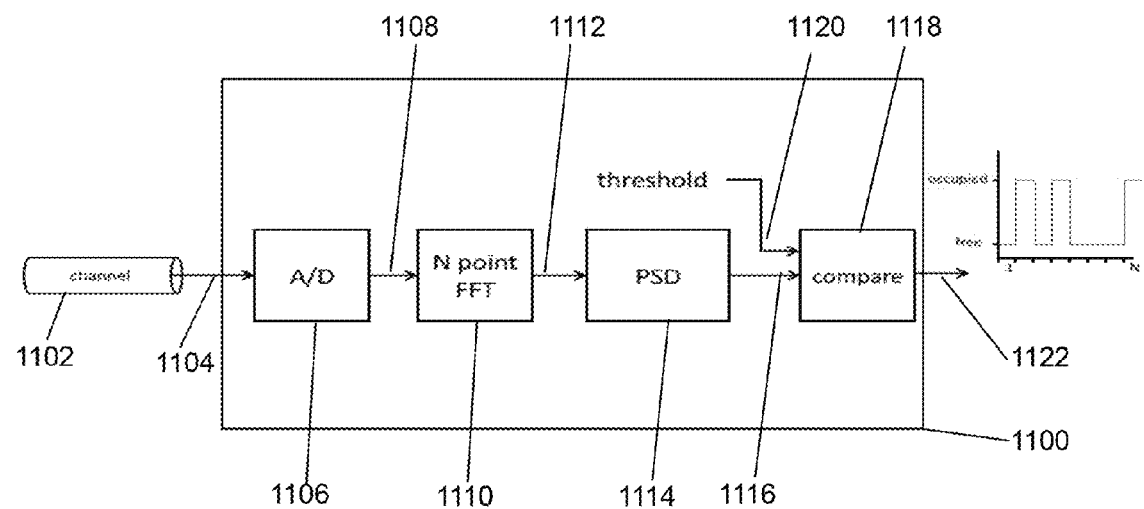
FIG. 11 shows a block diagram of a white space detector implemented using power spectral density analysis according to an embodiment of the invention.

FIG. 11 illustrates an alternative block diagram for a white space detector 1100 according to an embodiment of the invention. The white space detector 1100 of FIG. 11 may provide the functions of the white space detector 602 of FIG. 6. In this white space detector 1100, a power spectral density block 1114 is provided.

In FIG. 11, channel 1102 provides an input radio signal 1104 to an analogue to digital converter 1106. The analogue to digital converter 1106 provides a digital time domain signal 1108 to a 2N point fast Fourier transform (FFT) block 1110. The FFT block 1110 provides a frequency domain signal 1112 to a power spectral density (PSD) block 1114. The PSD block 1114 provides a power spectral density (PSD) signal 1116 for a frequency band of the input radio signal 1104 to a comparator 1118. The comparator 1118 compares the PSD signal 1116 with a threshold signal 1120. In this case, the threshold signal 1120 is indicative of a predetermined threshold value A suitable threshold value will typically be calculated based on observed signal characteristics, assumptions regarding (minimum) power levels of active transmitters and typically includes a margin of uncertainty. The comparator 1118 provides an output 1122 that is indicative of whether each frequency bin within the input radio signal 1104 has a PSD value above the calculated threshold level, or not. The width of each bin may be 1 Hz, 10 Hz, 100 Hz or 1 kHz, for example.

The main operations taking place the in the white space detector 1100 of FIG. 11 are provided in the simulation code fragment below.

```
......
N              = 1024;                       // choose 1024-point DFT
sample_rate    = 100000;                     // sampling f=100kHz
f              = sample_rate*(0:(N/2))/N;    // #frequency bins
......
values(t) == <value at time t>
y=dft(values,-1);                            // Discrete Fourier Transformation
magnitude = abs(y(1:len));                   // abs( ) => magnitude of a complex value
......
//
// White space classification based on PSD
//
// www.mathworks.com/matlabcentral/newsreader/view_thread/319333
//
Pxx = magnitude.^2/N;                        // Mean-Squared Power Spectrum
PSD = Pxx/sample_rate;                       // Power Spectral Density
//
thr = sum(PSD)/size(PSD,'*');                // a threshold, here average is taken
//
// White space classifier using PSD
//
for ix=1:len
    if PSD(ix)>thr then
        whitespace(ix) = OCCUPIED;           // frequency bin ix classified
                                             // as occupied
    else
        whitespace(ix) = WHTSPCE;            // frequency bin classified
                                             // as white space
    end
end
```

Figure 12:
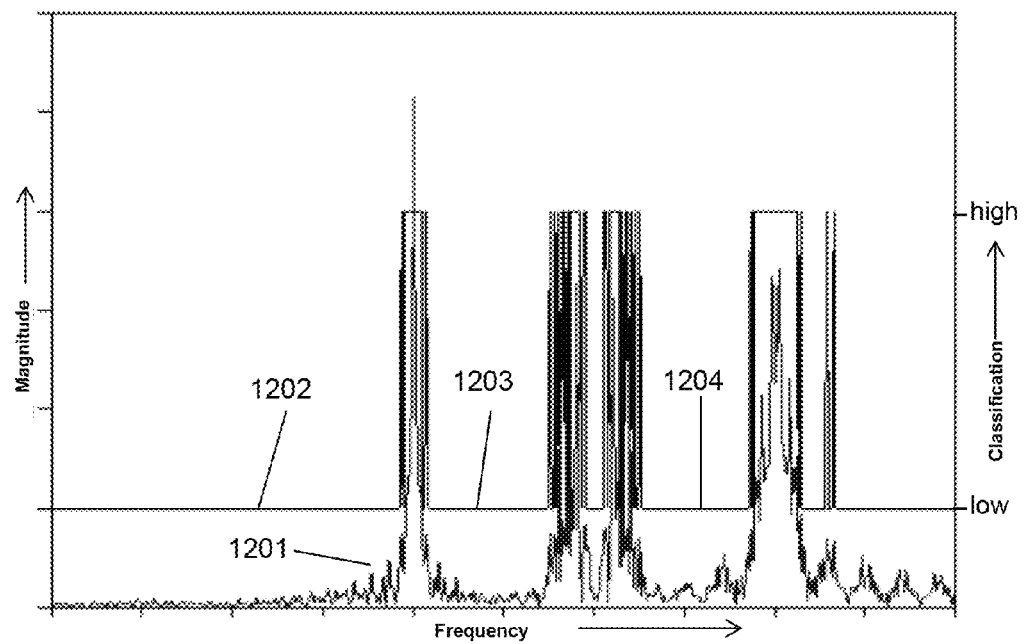
FIG. 12 illustrates an example frequency domain signal and the corresponding output of the white space detector of FIG. 11.

FIG. 12 shows the FFT magnitude against frequency, in Hertz, on the horizontal axis. FIG. 12 plots an example frequency domain signal 1201 and the corresponding output 1202 of the white space detector 1100 of FIG. 11. In this example, the mean PSD value has been used as the threshold value. When the frequency domain signal 1201 is below the threshold, the corresponding output 1202 is low, indicating that whitespace is present at that frequency. Conversely, the frequency domain signal 1201 is above the threshold, the corresponding output 1202 is high, indicating that whitespace is not present at that frequency.

The white space detector may identify any unused channels that are adjacent to one another in the frequency domain, which together may be referred to as a region of white space. The white space detector can then calculate the width of the region of white space to determine if the region has sufficient bandwidth to provide a channel on which a transmitter may transmit. A first white space region 1203 and a second white space region 1204 are indicated in FIG. 12. The processor may compare the width of the first white space region 1203 and a second white space region 1204 with a required signal bandwidth and determine if the first and second white space regions 1203, 1204 offer suitable candidate channels for signal transmission. If the required signal bandwidth is larger than provided by the second white space region 1204 but smaller or equal to the bandwidth provided by the first white space region 1203, the processor may determine that the first white space region 1203 is a suitable candidate channel for signal transmission and that the second white space region 1204 is not a suitable candidate channel for signal transmission. The processor may then provide an instruction to a transmitter to transmit on a candidate channel within the first white space region 1203. The instruction may be data indicative of the candidate channel.

The invention claimed is:

1. A radio circuit including a processor, the processor comprising a memory that includes instructions which when executed create a full spectrum receiver and a white space classifier, wherein the instructions configure the full spectrum receiver to:
  receive an analogue radio signal comprising multiple channels within a frequency band;
  transform the analogue radio signal to a digital radio signal; and
  transform the digital radio signal from a time domain signal to a frequency domain signal, and
  wherein the instructions configure the white space classifier to identify a plurality of unused channels within the frequency band using the frequency domain signal derived from the analogue radio signal and selecting one of the plurality of unused channels that has been used more recently than at least one of the remaining of the plurality of unused channels as a candidate channel for transmission, wherein the instructions further configure the processor to:
  utilise cyclostationary feature detection in order to identify unused channels;
  determine a power spectral density of the radio signal over at least part of the frequency band and to identify portions of the frequency bands with a power spectral density below a threshold value as white space;
  identify a continuous region of white space in the frequency domain;
  calculate the width of the region of white space; and
  determine if the width of the continuous region of white space provides sufficient bandwidth to provide a channel on which a transmitter may transmit.

2. The radio circuit of claim 1, wherein the instructions further configure the processor to provide an instruction to a transmitter to transmit on the candidate channel.

3. The radio circuit of claim 2, wherein the instructions further configure the processor to identify an unused channel that has been used within a predetermined preceding period of time and either select or deselect that unused channel as a candidate channel.

4. The radio circuit of claim 1, wherein the instructions configure the full spectrum receiver to provide the frequency domain signal as a frequency domain output signal.

5. The radio circuit of claim 1, wherein the instructions further configure the processor to provide the frequency domain output signal and identify any unused channels simultaneously.

6. The radio circuit of claim 1, wherein the analogue radio signal comprises dynamically allocated channels and the processor is further configured to continuously or periodically identify any unused channels within the frequency band using the frequency domain signal.

7. The radio circuit of claim 1, wherein the instructions further configure the processor to simultaneously identify whether a plurality of channels are unused.

8. The radio circuit of claim 6, wherein the instructions further configure the processor to simultaneously identify whether all respective channels of the frequency band are unused.

9. The radio circuit of claim 1, wherein the instructions configure the processor to apply a Fast Fourier transform to transform the radio signal from the time domain signal to the frequency domain signal.

10. A method of processing a radio signal comprising:
  receiving an analogue radio signal comprising multiple channels within a frequency band;

transform the analogue radio signal to a digital radio signal;

transforming the digital radio signal from a time domain signal to a frequency domain signal; and identifying a plurality of unused channels within the frequency band using the frequency domain signal derived from the radio signal and selecting one of the plurality of unused channels that has been used more recently than at least one of the remaining of the plurality of unused channels as a candidate channel for transmission;

utilising cyclostationary feature detection in order to identify unused channels;

determining a power spectral density of the radio signal over at least part of the frequency band and to identify portions of the frequency bands with a power spectral density below a threshold value as white space;

identifying a continuous region of white space in the frequency domain;

calculating the width of the region of white space; and determining if the width of the continuous region of white space provides sufficient bandwidth to provide a channel on which a transmitter may transmit.

\* \* \* \* \*